US011805544B2

(12) United States Patent
Chen et al.

(10) Patent No.: US 11,805,544 B2
(45) Date of Patent: *Oct. 31, 2023

(54) METHOD AND APPARATUS FOR LBT FAILURE DETECTION

(71) Applicant: Hannibal IP LLC, Frisco, TX (US)

(72) Inventors: Hung-Chen Chen, Hsinchu (TW); Chie-Ming Chou, Hsinchu (TW); Chia-Hung Wei, Hsinchu (TW); Mei-Ju Shih, Hsinchu (TW)

(73) Assignee: Hannibal IP LLC, Frisco, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,664

(22) Filed: Feb. 4, 2022

(65) Prior Publication Data

US 2022/0232622 A1 Jul. 21, 2022

Related U.S. Application Data

(63) Continuation of application No. 16/737,787, filed on Jan. 8, 2020, now Pat. No. 11,272,535.

(Continued)

(51) Int. Cl.
*H04W 74/00* (2009.01)
*H04W 74/08* (2009.01)
(Continued)

(52) U.S. Cl.
CPC ..... *H04W 74/008* (2013.01); *H04W 36/0058* (2018.08); *H04W 36/0069* (2018.08);
(Continued)

(58) Field of Classification Search
CPC ......... H04W 36/0058; H04W 36/0069; H04W 36/00835; H04W 36/06; H04W 36/305;
(Continued)

(56) References Cited

U.S. PATENT DOCUMENTS 8,625,486 B2   1/2014 Wang et al.
11,272,535 B2 *  3/2022 Chen ................... H04W 36/305
(Continued)

FOREIGN PATENT DOCUMENTS

CN        107371168 A     11/2017
CN        107770868 A      3/2018
(Continued)

OTHER PUBLICATIONS

Indian Patent Application No. 202147035288.0, filed Aug. 5, 2021, as a national phase of International Patent Application No. PCT/CN2020/070940 (WO2020/143672A1).
(Continued)

*Primary Examiner* — Kashif Siddiqui
(74) *Attorney, Agent, or Firm* — Marcella M. Bodner; Cole Schotz, P.C.

(57) ABSTRACT

A method for LBT failure detection performed by a UE is provided. The method includes: receiving, by a MAC entity of the UE, an LBT failure indication from a lower layer for all UL transmissions; increasing an LBT failure counter when the MAC entity receives the LBT failure indication; determining an LBT failure event occurs when the LBT failure counter is greater than or equal to a threshold; and resetting the LBT failure counter after the MAC entity has not received the LBT failure indication for a time period.

14 Claims, 5 Drawing Sheets

Related U.S. Application Data

(60) Provisional application No. 62/790,099, filed on Jan. 9, 2019.

(51) Int. Cl.
  H04W 72/044 (2023.01)
  H04W 36/00 (2009.01)
  H04W 36/30 (2009.01)

(52) U.S. Cl.
  CPC ... *H04W 36/00835* (2018.08); *H04W 36/305* (2018.08); *H04W 72/044* (2013.01); *H04W 74/0808* (2013.01)

(58) Field of Classification Search
  CPC . H04W 36/36; H04W 72/044; H04W 74/008; H04W 74/0808
  See application file for complete search history.

(56) References Cited

U.S. PATENT DOCUMENTS

| | | | |
|---|---|---|---|
| 2017/0006641 A1* | 1/2017 | Dinan | H04W 74/0833 |
| 2017/0231002 A1 | 8/2017 | Babaei et al. | |
| 2017/0231005 A1* | 8/2017 | Babaei | H04L 5/0007 |
| 2018/0124825 A1* | 5/2018 | Lee | H04W 74/006 |
| 2018/0124831 A1* | 5/2018 | Dinan | H04W 74/0808 |
| 2018/0176961 A1* | 6/2018 | Babaei | H04W 74/0833 |
| 2018/0184362 A1* | 6/2018 | Babaei | H04W 76/18 |
| 2019/0363843 A1* | 11/2019 | Gordaychik | H04L 1/1887 |
| 2020/0077446 A1* | 3/2020 | Agiwal | H04W 16/14 |
| 2020/0154480 A1* | 5/2020 | Jose | H04W 72/02 |
| 2020/0221309 A1* | 7/2020 | Ozturk | H04W 74/0833 |
| 2020/0267763 A1* | 8/2020 | Deogun | H04W 56/001 |
| 2021/0100031 A1* | 4/2021 | Cirik | H04W 76/19 |
| 2021/0352717 A1 | 11/2021 | Lee et al. | |
| 2022/0039016 A1 | 2/2022 | Terry et al. | |

FOREIGN PATENT DOCUMENTS

| | | |
|---|---|---|
| CN | 108633097 A | 10/2018 |
| CN | 113273269 A | 8/2021 |
| EP | 3909331 A1 | 11/2021 |
| WO | 2017171999 A1 | 10/2017 |
| WO | 2017193843 A1 | 11/2017 |
| WO | 2020087369 | 5/2020 |
| WO | 2020143672 A1 | 7/2020 |

OTHER PUBLICATIONS

Mexican Patent Application No. MX/a/2021/008190, filed on Jul. 9, 2021, as a national phase of International Patent Application No. PCT/CN2020/070940 (WO2020/143672A1).
Vietnamese Patent Application No. 1-2021-4862. filed on Jan. 8, 2020.
Issue Notification issued for U.S. Appl. No. 16/737,787 dated Feb. 16, 2022.
Extended European Search Report issued for European Patent Application No. 20739185.5, dated Jul. 26, 2022.
Final Examination Report issued for Indian Patent Application No. 202147035288, dated Mar. 11, 2022.
International Preliminary Report on Patentability issued for International Patent Application No. PCT/CN2020/070940 dated Jun. 16, 2021.
International Search Report issued for International Patent Application No. PCT/CN2020/070940 dated Mar. 27, 2020.
Nritten Opinion of the International Searching Authority issued for International Patent Application No. PCT/CN2020/070940 dated Mar. 27, 2020.
Notice of Allowance issued for U.S. Appl. No. 16/737,787 dated Nov. 1, 2021.
Non-Final Office Action issued for U.S. Appl. No. 16/737,787 dated Apr. 16, 2021.
Final Office Action issued for U.S. Appl. No. 16/737,787 dated Jul. 27, 2021.
XP051557768—VIVO: "LBT impacts on BFD in NR-U," 3GPP Draft; R2-1818267, 3rd Generation Partnership Project (3GPP), Mobile Competence Centre, Sophia-Antipolis Cedex; France—retrieved from the Internet on Nov. 12, 2018: URL: http://www.3gpp.org/ftp/Meetings_3GPP_SYNC/RAN2/Docs/R2-1818267.zip.
XP051557634—CMCC: "Considerations on BWP switching and multi-activation for NR-U," 3GPP Draft; R2-1818129 (resubmission of R2-1815251), 3rd Generation Partnership Project (3GPP), Mobile Competence Centre, Sophia-Antipolis Cedex; France—retrieved from the Internet on Nov. 12, 2018: URL: http://www.3gpp.org/ftp/Meetings_3GPP_SYNC/RAN2/Docs/R2-1818129.zip.
XP051557645—CMCC: "Consideration of RACH procedure in NR-U system," 3GPP Draft; R2-1818141, 3rd Generation Partnership Project (3GPP), Mobile Competence Centre, Sophia-Antipolis Cedex; France—retrieved from the Internet on Nov. 12, 2018: URL: http://www.3gpp.org/ftp/Meetings_3GPP_SYNC/RAN2/Docs/R2-1818141.zip.
Non-Final Office Action dated Mar. 29, 2023 for corresponding Chinese Patent Application No. 2020800082931.
Search Report dated Mar. 29, 2023 for corresponding Chinese Patent Application No. 20200082931.
6G, 3GPP TS 38.321 V15.3.0, 2018, 3rd Generation Partnership Project; Technical Specification Group Radio Access Network; NR; Medium Access Control (MAC) protocol specification (Release 15).
3GPP TSG-RAN2 Meeting #62bis, 2008, R2-083143, Change Request 36.321 CR rev 8.20.

* cited by examiner

METHOD AND APPARATUS FOR LBT FAILURE DETECTION

CROSS-REFERENCE TO RELATED APPLICATION(S)

This application is a continuation of U.S. patent application Ser. No. 16/737,787 filed on Jan. 8, 2020, which claims the benefit of and priority to a provisional U.S. Patent Application Ser. No. 62/790,099, filed on Jan. 9, 2019, entitled "Lower Layer Indications for LBT Results," (hereinafter referred to as "US76297 application"). The disclosure of the US76297 application is hereby incorporated fully by reference into the present application.

FIELD

The present disclosure generally relates to wireless communication, and more particularly, to Listen-Before-Talk (LBT) failure indication and LBT failure event determination in the next generation wireless communication networks.

BACKGROUND

Various efforts have been made to improve different aspects of wireless communications, such as data rate, latency, reliability and mobility, for the next generation (e.g., fifth generation (5G) New Radio (NR)) wireless communication systems. LBT is a mechanism by which a wireless device applies Clear Channel Assessment (CCA) before using the channel. The 3rd Generation Partnership Project (3GPP) specifies a conservative LBT scheme similar to that used by Wi-Fi nodes to ensure coexistence of Licensed Assisted Access (LAA) with Wi-Fi. LAA uses carrier aggregation in downlink transmission to combine LTE in an unlicensed spectrum (e.g., 5 GHz) with LTE in a licensed band. In NR, LBT may be required prior to any transmission when operating on an unlicensed spectrum. There is a need in the industry for an improved and efficient mechanism for a UE to handle LBT failure that may take place in the physical layer.

SUMMARY

The present disclosure is directed to a method for LBT failure detection performed by a UE in the next generation wireless communication networks.

According to an aspect of the present disclosure, a UE is provided. The UE includes one or more non-transitory computer-readable media having computer-executable instructions embodied thereon and at least one processor coupled to the one or more non-transitory computer-readable media. The at least one processor is configured to execute the computer-executable instructions to: receive, by a Medium Access Control (MAC) entity of the UE, an LBT failure indication from a lower layer for all UL transmissions; increase an LBT failure counter when the MAC entity receives the LBT failure indication; determine an LBT failure event occurs when the LBT failure counter is greater than or equal to a threshold; and reset the LBT failure counter after the MAC entity has not received the LBT failure indication for a time period.

According to another aspect of the present disclosure, a method for LBT failure detection performed by a UE is provided. The method includes: receiving, by a MAC entity of the UE, an LBT failure indication from a lower layer for all UL transmissions; increasing an LBT failure counter when the MAC entity receives the LBT failure indication; determining an LBT failure event occurs when the LBT failure counter is greater than or equal to a threshold; and resetting the LBT failure counter after the MAC entity has not received the LBT failure indication for a time period.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
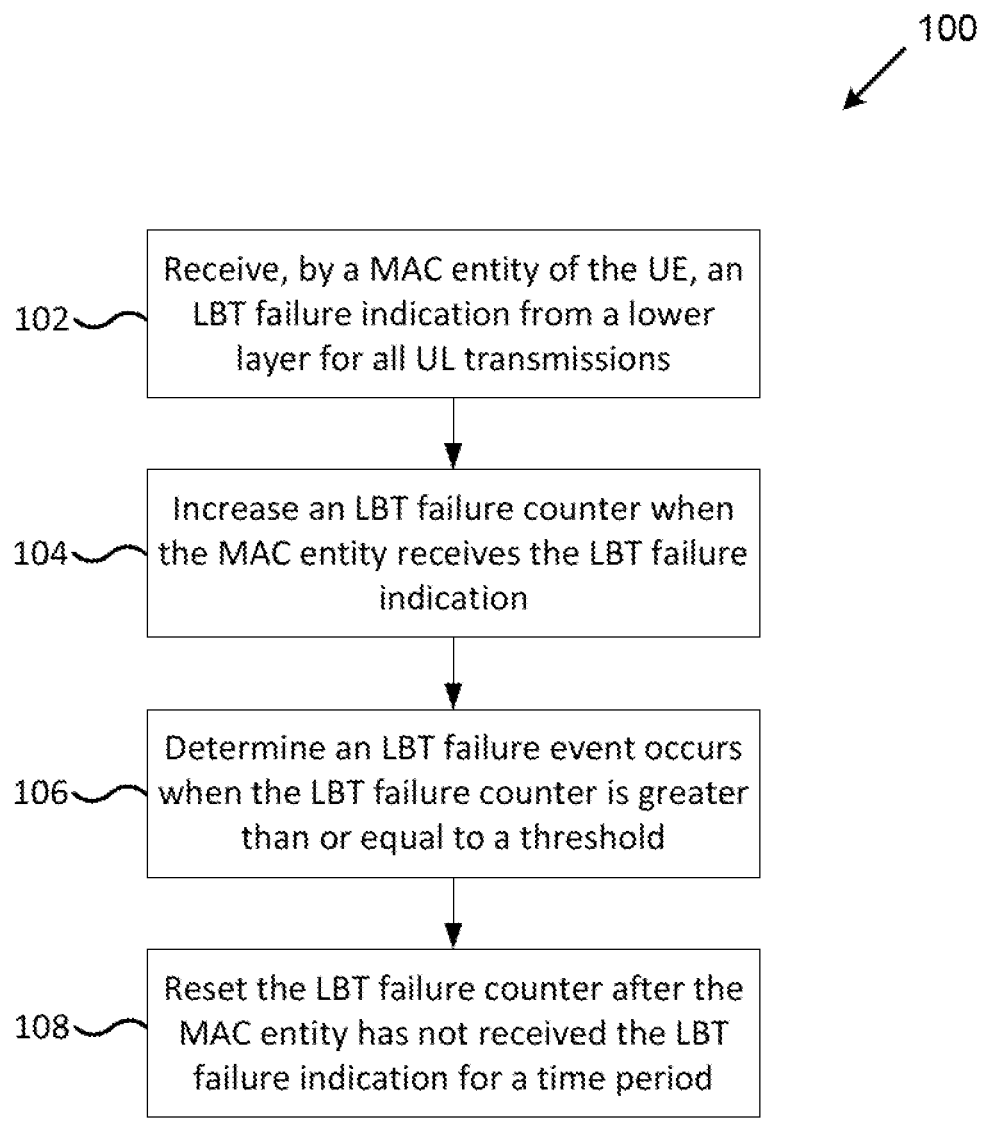
FIG. 1 is a flowchart of an example method for LBT failure detection performed by a UE, according to an example implementation of the present application.

The following description contains specific information pertaining to example implementations in the present disclosure. The drawings in the present disclosure and their accompanying detailed description are directed to merely example implementations. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features may be identified (although, in some examples, not shown) by the same numerals in the example figures. However, the features in different implementations may be differed in other respects, and thus shall not be narrowly confined to what is shown in the figures.

The description uses the phrases "in one implementation," or "in some implementations," which may each refer to one or more of the same or different implementations. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent. The expression "at least one of A, B and C" or "at least one of the following: A, B and C" means "only A, or only B, or only C, or any combination of A, B and C."

Additionally, for the purposes of explanation and non-limitation, specific details, such as functional entities, techniques, protocols, standard, and the like are set forth for providing an understanding of the described technology. In other examples, detailed description of well-known methods, technologies, systems, architectures, and the like are omitted so as not to obscure the description with unnecessary details.

Persons skilled in the art will immediately recognize that any network function(s) or algorithm(s) described in the present disclosure may be implemented by hardware, software or a combination of software and hardware. Described functions may correspond to modules which may be software, hardware, firmware, or any combination thereof. The software implementation may comprise computer executable instructions stored on computer readable medium such as memory or other type of storage devices. For example, one or more microprocessors or general-purpose computers with communication processing capability may be programmed with corresponding executable instructions and carry out the described network function(s) or algorithm(s). The microprocessors or general-purpose computers may be formed of Applications Specific Integrated Circuitry (ASIC), programmable logic arrays, and/or using one or more Digital Signal Processor (DSPs). Although some of the example implementations described in this specification are oriented to software installed and executing on computer hardware, nevertheless, alternative example implementations implemented as firmware or as hardware or combination of hardware and software are well within the scope of the present disclosure.

The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long Term Evolution (LTE) system, an LTE-Advanced (LTE-A) system, an LTE-Advanced Pro system, or a 5G NR Radio Access Network (RAN)) typically includes at least one base station, at least one UE, and one or more optional network elements that provide connection towards a network. The UE communicates with the network (e.g., a Core Network (CN), an Evolved Packet Core (EPC) network, an Evolved Universal Terrestrial Radio Access network (E-UTRAN), a 5G Core (5GC), or an internet), through a RAN established by one or more base stations.

It should be noted that, in the present application, a UE may include, but is not limited to, a mobile station, a mobile terminal or device, a user communication radio terminal. For example, a UE may be a portable radio equipment, which includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a radio access network.

A base station may be configured to provide communication services according to at least one of the following Radio Access Technologies (RATs): Worldwide Interoperability for Microwave Access (WiMAX), Global System for Mobile communications (GSM, often referred to as 2G), GSM Enhanced Data rates for GSM Evolution (EDGE) Radio Access Network (GERAN), General Packet Radio Service (GPRS), Universal Mobile Telecommunication System (UMTS, often referred to as 3G) based on basic wideband-code division multiple access (W-CDMA), high-speed packet access (HSPA), LTE, LTE-A, eLTE (evolved LTE, e.g., LTE connected to 5GC), NR (often referred to as 5G), and/or LTE-A Pro. However, the scope of the present application should not be limited to the above-mentioned protocols.

A base station may include, but is not limited to, a node B (NB) as in the UMTS, an evolved node B (eNB) as in the LTE or LTE-A, a radio network controller (RNC) as in the UMTS, a base station controller (BSC) as in the GSM/GERAN, a ng-eNB as in an E-UTRA base station in connection with the 5GC, a next generation Node B (gNB) as in the 5G-RAN, and any other apparatus capable of controlling radio communication and managing radio resources within a cell. The base station may serve one or more UEs through a radio interface.

The base station is operable to provide radio coverage to a specific geographical area using a plurality of cells forming the radio access network. The base station supports the operations of the cells. Each cell is operable to provide services to at least one UE within its radio coverage. More specifically, each cell (often referred to as a serving cell) provides services to serve one or more UEs within its radio coverage (e.g., each cell schedules the downlink and optionally uplink resources to at least one UE within its radio coverage for downlink and optionally uplink packet transmissions). The base station can communicate with one or more UEs in the radio communication system through the plurality of cells. A cell may allocate sidelink (SL) resources for supporting Proximity Service (ProSe) or Vehicle to Everything (V2X) service. Each cell may have overlapped coverage areas with other cells.

As discussed above, the frame structure for NR is to support flexible configurations for accommodating various next generation (e.g., 5G) communication requirements, such as Enhanced Mobile Broadband (eMBB), Massive Machine Type Communication (mMTC), Ultra-Reliable and Low-Latency Communication (URLLC), while fulfilling high reliability, high data rate and low latency requirements. The Orthogonal Frequency-Division Multiplexing (OFDM) technology as agreed in 3GPP may serve as a baseline for NR waveform. The scalable OFDM numerology, such as the adaptive sub-carrier spacing, the channel bandwidth, and the Cyclic Prefix (CP) may also be used. Additionally, two coding schemes are considered for NR: (1) Low-Density Parity-Check (LDPC) code and (2) Polar Code. The coding scheme adaption may be configured based on the channel conditions and/or the service applications.

Moreover, it is also considered that in a transmission time interval TX of a single NR frame, a downlink (DL) transmission data, a guard period, and an uplink (UL) transmission data should at least be included, where the respective portions of the DL transmission data, the guard period, the UL transmission data should also be configurable, for example, based on the network dynamics of NR. In addition, sidelink resources may also be provided in an NR frame to support ProSe services or V2X services.

The next-generation (e.g., 5G NR) wireless network is envisioned to support more capacity, data, and services. A UE configured with multi-connectivity may be connected to a Master Node (MN) as an anchor and one or more Secondary Nodes (SNs) for data delivery. Each one of these nodes may be formed by a cell group that includes one or more cells. For example, an MN may be formed by a Master Cell Group (MCG), and an SN may be formed by a Secondary Cell Group (SCG). In other words, for a UE configured with dual connectivity (DC), the MCG may be a set of one or more serving cells including the Primary Cell (PCell) and zero or more Secondary Cells (SCells), and the SCG may be a set of one or more serving cells including the Primary Secondary Cell (PSCell) and zero or more Secondary Cells (SCells).

As described above, the PCell may be an MCG cell that operates on the primary frequency, in which the UE either performs the initial connection establishment procedure or initiates the connection reestablishment procedure. In the Multi-Radio Dual Connectivity (MR-DC) mode, the PCell may belong to the MN. The PSCell may be an SCG cell in which the UE performs random access (e.g., when performing reconfiguration with a sync procedure). In MR-DC, the PSCell may belong to the SN. A Special Cell (SpCell) may refer to a PCell of the MCG or a PSCell of the SCG, depending on whether the MAC entity is associated with the MCG or the SCG. Otherwise the term Special Cell may refer to the PCell. A Special Cell may support a Physical Uplink Control Channel (PUCCH) transmission and contention-based Random Access, and may always be activated. Additionally, for a UE in an RRC_CONNECTED state that is not configured with carrier aggregation/dual connectivity (CA/DC), the UE may communicate with only one serving cell which may be the primary cell. Conversely, for a UE in the RRC_CONNECTED state that is configured with CA/DC, a set of serving cells including the special cell(s) and all of the secondary cells may communicate with the UE.

In addition, the terms "system" and "network" herein may be used interchangeably. The term "and/or" herein is only an association relationship for describing associated objects, and represents that three relationships may exist. For example, A and/or B may indicate that: A exists alone, A and B exist at the same time, or B exists alone. In addition, the character "/" herein generally represents that the former and latter associated objects are in an "or" relationship.

In a Random Access (RA) procedure, two UE variables, including a counter for preamble transmission (e.g., PREAMBLE_TRANSMISSION_COUNTER) and a counter for power ramping (e.g., PREAMBLE_POWER_RAMPING_COUNTER), may be increased with every attempt. In NR-Unlicensed (NR-U) operations, power ramping may not be applied (e.g., the UE variable PREAMBLE_POWER_RAMPING_COUNTER does not increase) since a preamble is not transmitted due to LBT failure. If the preamble is not transmitted due to LBT failure, the UE may perform the random access resource selection procedure again, and, the UE variable PREAMBLE_TRANSMISSION_COUNTER may not increase accordingly. As such, an indication of LBT failure from a physical layer to a MAC layer may be required (e.g., to maintain the counters).

Moreover, given that a Scheduling Request (SR) counter may not be updated depending on the LBT outcome, it may be beneficial to consider an additional mechanism where an SR procedure may be determined to be unsuccessful due to a systematic uplink LBT failure. This mechanism may be generally applicable to other uplink transmissions for determining a radio link problem.

When operating on an unlicensed spectrum, if a UE wants to transmit a preamble, a msg3 in a 4-Step RA procedure, a msgA in a 2-Step RA procedure, data on uplink configured grants, or an SR on a PUCCH resource, the UE may need to pass LBT first to occupy an LBT channel, a sub-band, a Bandwidth Part (BWP), a carrier, or a cell. Since the RA procedure, the SR procedure, or the transmission on configured grants may be mainly handled by the MAC layer, an LBT failure indication or an LBT success indication from a lower layer (that is in charge of LBT mechanism) may be required for those operations.

In one implementation, an upper layer (e.g., a MAC layer) may instruct a lower layer (e.g., a PHY layer) to transmit a Random Access Preamble using a selected Physical Random Access Channel (PRACH) occasion, a corresponding Random Access Radio Network Temporary Identifier (RA-RNTI), a preamble index (e.g., a UE variable PREAMBLE_INDEX as described in Technical Standard (TS) 38.321) and a preamble received target power (e.g., a UE variable PREAMBLE_RECEIVED_TARGET_POWER as described in TS 38.321). In one implementation, the upper layer (e.g., the MAC layer) may instruct the lower layer (e.g., the PHY layer) to transmit a msgA (of a 2-step RA procedure) using a selected PRACH occasion, an associated PUSCH resource, a corresponding RA-RNTI (if available), a corresponding MSGB-RNTI (if available), a selected preamble index (e.g., PREAMBLE_INDEX) and a preamble received target power (e.g., PREAMBLE_RECEIVED_TARGET_POWER). In one implementation, the upper layer (e.g., the MAC layer) may instruct the lower layer (e.g., the PHY layer) to transmit a msg3 (of a 4-step RA procedure) using the received uplink grant. In one implementation, the upper layer (e.g., the MAC layer) may instruct the lower layer (e.g., the PHY layer) to signal an SR on one valid PUCCH resource. In one implementation, the upper layer (e.g., the MAC layer) may instruct the lower layer (e.g., the PHY layer) to transmit UL data using configured grants which are configured by a Radio Resource Control (RRC) layer per serving cell and per BWP.

FIG. 1 is a flowchart of an example method 100 for LBT failure detection performed by a UE, according to an example implementation of the present application. In action 102, a MAC entity of the UE may receive an LBT failure indication from a lower layer (e.g., a PHY layer) for all UL transmissions. The LBT failure indication may be regardless of UL transmission types. For example, the PHY layer may provide a common LBT failure indication to the MAC entity when LBT fails for different UL transmission operations. In one implementation, the PHY layer may send an LBT failure indication to the MAC entity when the PHY layer determines that an LBT procedure of an UL transmission (e.g., regardless of UL transmission types) fails. In one implementation, the PHY layer may drop the UL transmission when it determines that the LBT procedure fails.

In action 104, the UE (e.g., the MAC entity of the UE) may increase an LBT failure counter when the MAC entity receives the LBT failure indication. In one implementation, the LBT failure counter is increased by a step value (e.g., 1) whenever the MAC entity receives the LBT failure indication.

In action 106, the UE (e.g., the MAC entity of the UE) may determine an LBT failure event occurs when the LBT failure counter is greater than or equal to a threshold. In one implementation, the threshold may be a parameter (e.g., lbt-FailureInstanceMaxCount) configured by a configuration (e.g., an RRC configuration). In one implementation, the threshold may be broadcast in system information.

In action 108, the UE (e.g., the MAC entity of the UE) may reset the LBT failure counter after the MAC entity has not received the LBT failure indication for a time period. In one implementation, the UE may set the LBT failure counter to an initial value (e.g., 0) when the UE resets the LBT failure counter. In one implementation, the time period may be indicated by a configurable timer (e.g., lbt-FailureDetectionTimer) configured by a configuration (e.g., an RRC configuration). In one implementation, the time period may be broadcast in system information.

An LBT failure may be caused by different operations or different UL transmission types (e.g., transmission of RA preamble, msgA, msg3, SR, or UL data on configured grants). In one implementation, there may be one common LBT failure counter for all UL transmission types. In one implementation, when there are consecutive k1 LBT failure indications (or consistent k1 LBT failure indications) received from a lower layer (e.g., a PHY layer) regardless of the UL transmission types, a MAC entity may determine an LBT failure event occurs. k1 may be the maximum number of consecutive LBT failure indications (or consistent LBT failure indications). For example, k1 may be a positive integer indicating the threshold in action 106. The LBT failure event may also be referred to as a "consistent LBT failure" since the MAC entity consistently receives the LBT failure indication.

In one implementation, there may be multiple LBT failure counters corresponding to different UL transmission operations, and thus there may be different values of k1 for different UL transmission operations. In one implementation, the value of k1 for each operation may be provided in a common signaling (e.g., an LBT configuration that provides LBT related information or parameters). In one implementation, the value of k1 for different operations may be provided separately in different signaling. For example, the value of k1 for an RA procedure may be provided in a random access related signaling (e.g., dedicated/common RACH configuration), the value of k1 for SR may be provided in an SR related signaling, and the value of k1 for configured grants may be provided in a related Configured Grant Configuration.

In one implementation, after determining that the LBT failure event occurs, the MAC entity may indicate an LBT failure problem to an upper layer (e.g., an RRC layer). In one implementation, the MAC entity may indicate the LBT failure problem and the operation that causes the LBT failure problem to the upper layer. For example, an LBT failure cause may be used to indicate to the upper layer what kind of failure problem happens to the MAC entity. In one implementation, the LBT failure cause may have one or more bits (e.g., 2 bits), where different values may represent the different operations causing the failure. It may depend on UE's implementation whether to indicate different LBT failure causes from the MAC layer to the RRC layer. In one implementation, the RRC layer may receive an LBT failure problem related to the SR operation from the MAC layer, and the RRC layer may receive another LBT failure problem related to the RA operation from the MAC layer, and so on.

In one implementation, the UE may use a UE variable (e.g., the LBT failure counter in action 104), to count the number of consecutive LBT failure indications regardless of the UL transmission types. In one implementation, the UE (e.g., the MAC entity of the UE) may set the LBT failure counter to 0 in the initial state. In one implementation, the UE (e.g., the MAC entity of the UE) may increase the LBT failure counter by 1 when receiving an LBT failure indication for all UL transmissions. For example, the UE (e.g., the MAC entity of the UE) may first increase the LBT failure counter by 1 when receiving an LBT failure indication that is caused by an unsuccessful preamble transmission due to LBT failure. Then, the UE (e.g., the MAC entity of the UE) may again increase the LBT failure counter by 1 when receiving another LBT failure indication that is caused by an unsuccessful UL transmission using configured grants due to LBT failure, and so on.

In one implementation, the threshold (e.g., the value of k1) may be a fixed value or configured by the network (e.g., via dedicated signaling or via broadcasting in system information). In one implementation, if the threshold is not configured by the network, the UE may apply a default value for the threshold. In one implementation, the UE may first apply the threshold broadcast in system information and then apply a new value of the threshold if configured via dedicated signaling (e.g., RRC signaling).

In one implementation, the MAC entity may consider LBT for a UL transmission attempt as successful after the MAC entity has not received an LBT failure indication for a time period. In one implementation, when the MAC entity considers LBT for a UL transmission attempt as successful, the MAC entity may reset the LBT failure counter (e.g., set the LBT failure counter to 0). In one implementation, the UE (or the MAC entity of the UE) may reset the LBT failure counter when the MAC entity indicates an LBT failure problem to an upper layer (e.g., an RRC layer). In one implementation, the UE may stop the LBT failure counter when the MAC entity indicates the LBT failure problem to the upper layer.

In one implementation, the UE may reset the LBT failure counter when the UE performs a re-establishment procedure. In one implementation, the UE may reset the LBT failure counter when the UE switches to another carrier, BWP, channel, or LBT unit. In one implementation, the UE may reset the LBT failure counter when a reconfiguration is received related to LBT failure handling (e.g., when at least one of the time period in action 108 and the threshold in action 106 is reconfigured). In one implementation, the UE may reset the LBT failure counter when a reset of the MAC entity is requested (e.g., requested by the upper layers). In one implementation, the UE may reset the LBT failure counter when an operating condition changes, such as a change in the operating (or serving) LBT channel, sub-band, BWP, carrier, or cell. In one implementation, the UE may reset the LBT failure counter upon RRC state transition (e.g., from the RRC_IDLE state to the RRC_CONNECTED state or from the RRC_INACTIVE state to the RRC_CONNECTED state).

Figure 2:
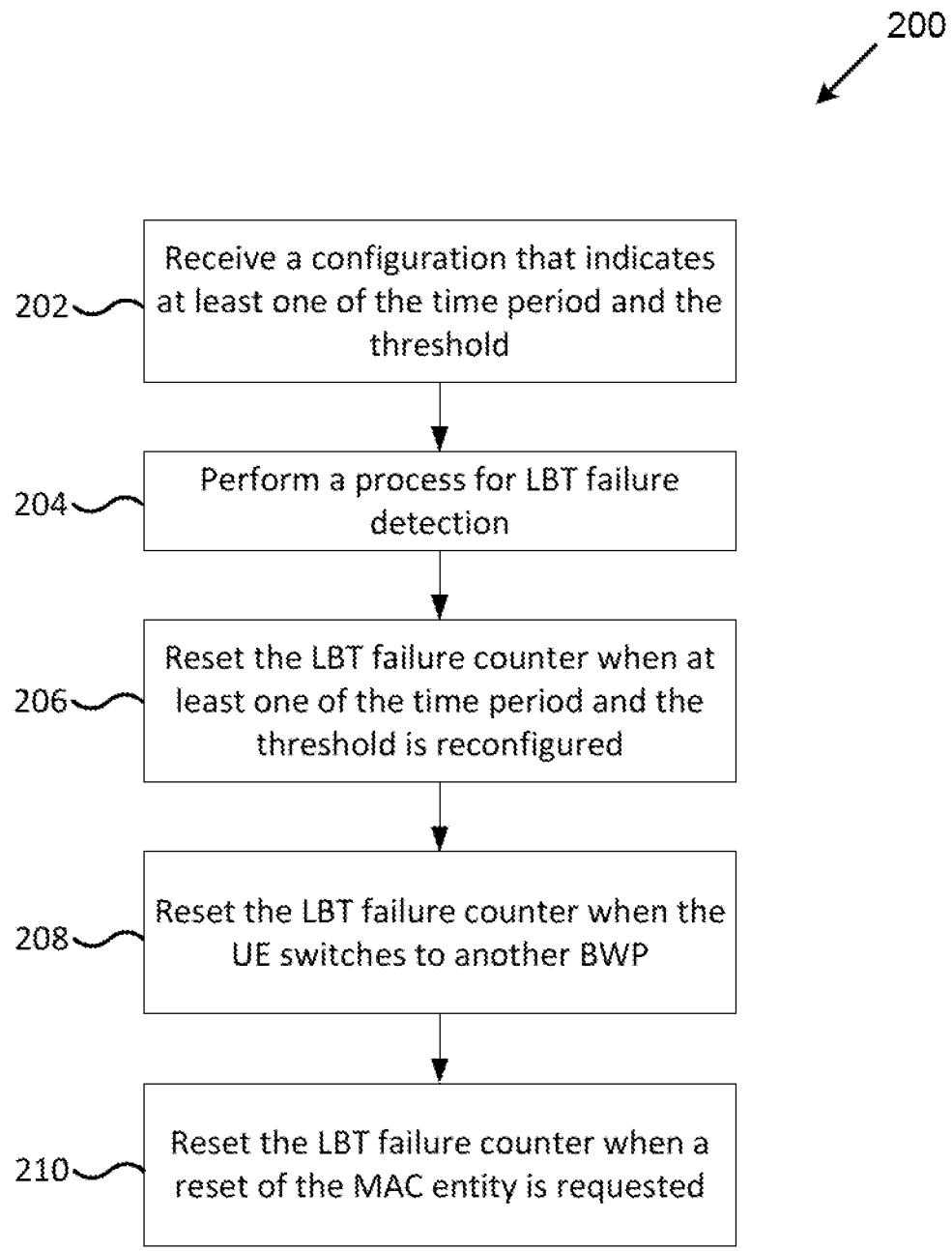
FIG. 2 is a flowchart of an example method for updating an LBT failure counter performed by a UE, according to an example implementation of the present application.

FIG. 2 is a flowchart of an example method 200 for updating an LBT failure counter performed by a UE, according to an example implementation of the present application. In action 202, the UE may receive a configuration that indicates at least one of the time period (used in action 108 of method 100) and the threshold (used in action 106 of method 100). The configuration may be transmitted via dedicated signaling (e.g., RRC signaling) or broadcast in system information. In action 204, the UE may perform a process for LBT failure detection that may be similar to method 100 shown in FIG. 1. Actions 206, 208 and 210 may correspond to three possible conditions to reset the LBT failure counter. In action 206, the UE may reset the LBT failure counter when at least one of the time period and the threshold is reconfigured (e.g., when the UE receives an RRC reconfiguration message that changes at least one of the time period and the threshold). In action 208, the UE may reset the LBT failure counter when the UE switches to another BWP. In action 210, the UE may reset the LBT failure counter when a reset of the MAC entity is requested. It should be noted that although actions 206, 208, and 210 are delineated as separate actions represented as independent blocks in FIG. 2, these separately delineated actions should not be construed as necessarily order dependent. The order in which the actions are performed in FIG. 2, is not intended to be construed as a limitation. Moreover, one or more of the actions 206, 208, and 210 may be omitted in some of the present implementations.

In one implementation, when an upper layer (e.g., the RRC layer) receives an LBT failure problem indication or the LBT failure event occurs because the LBT failure counter is greater than or equal to k1, the UE (e.g., the RRC layer of the UE) may perform at least one of the following actions based on configurations or pre-defined rules: perform a Radio Link Failure (RLF) recovery procedure, perform a re-establishment procedure, and switch an active BWP of the UE to another BWP or carrier. For example, when the LBT failure event occurs, the UE may switch the active UL BWP to another UL BWP. In one implementation, when the LBT failure event occurs, the UE may switch the active UL BWP to another UL BWP configured with common RACH resources. In some implementations, the UE may transmit an RRC re-establishment request in response to the LBT failure event. In one implementation, if a re-establishment procedure is performed due to an LBT failure problem, the UE may transmit an RRC re-establishment request (e.g., the RRCReestablishmentRequest message) indicating a re-establishment cause as LBT failure. In one implementation, the LBT failure problem indication is common for all operations. In another implementation, there is one specific LBT failure problem indication for each operation. When the upper layer receives the LBT failure problem indication for one specific operation, the upper layer may perform a specific action (e.g., triggering re-establishment procedure, triggering RLF recovery procedure, and/or switching to another carrier/BWP) based on the specific operation.

Figure 3:
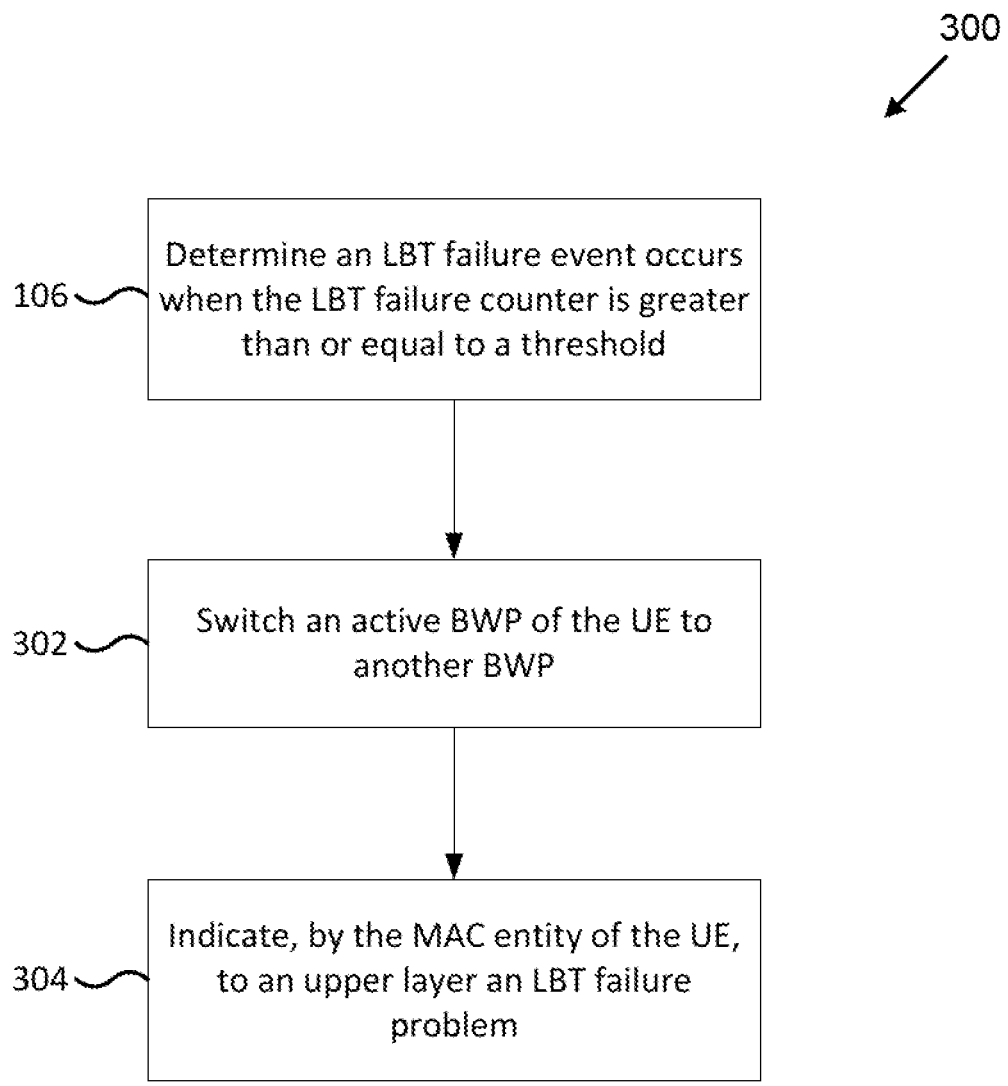
FIG. 3 is a flowchart of an example method performed by a UE after determining an LBT failure event occurs, according to an example implementation of the present application.

FIG. 3 is a flowchart of an example method 300 performed by a UE after determining an LBT failure event occurs, according to an example implementation of the present application. Action 106 shown in FIG. 3 may be corresponding to action 106 shown in FIG. 1. After the UE determines the LBT failure event occurs, there may be several implementations for the UE to respond to such situation. In one implementation, the UE may perform action 302 to switch an active (UL) BWP of the UE to another (UL) BWP. In one implementation, the UE may perform action 304, where the MAC entity of the UE may indicate an LBT failure problem to an upper layer (e.g., the RRC layer). It should be noted that action 302 and action 304 are not construed as necessarily order dependent. Moreover, both of action 302 and action 304 may be optionally performed in some of the present implementations.

In one implementation, when an upper layer (e.g., the RRC layer) receives an LBT failure problem indication or the LBT failure event occurs because the LBT failure counter is greater than or equal to the threshold, the UE (e.g., the RRC layer of the UE) may transmit an LBT failure problem report to the network. The LBT failure problem report may include information of which LBT channel/carrier/BWP/unit suffers from the LBT failure problem, or which operation suffers from the LBT failure problem. In dual connectivity mode (or MR-DC mode), if a UE determines an LBT failure problem on a Primary Secondary Cell (PSCell) or a Secondary Cell Group (SCG) operating on an unlicensed spectrum, the UE may send an LBT failure problem report or an SCG failure report (including information of the LBT failure problem) to the master node (which may operate on the licensed spectrum or the unlicensed spectrum). In dual connectivity mode (or MR-DC mode), if a UE determines an LBT failure problem on a Primary Cell (PCell) or a Master Cell Group (MCG) operating on the unlicensed spectrum, the UE may send an LBT failure problem report or an MCG failure report (including information of the LBT failure problem) to the secondary node (which may operate on licensed spectrum or unlicensed spectrum).

Figure 4:
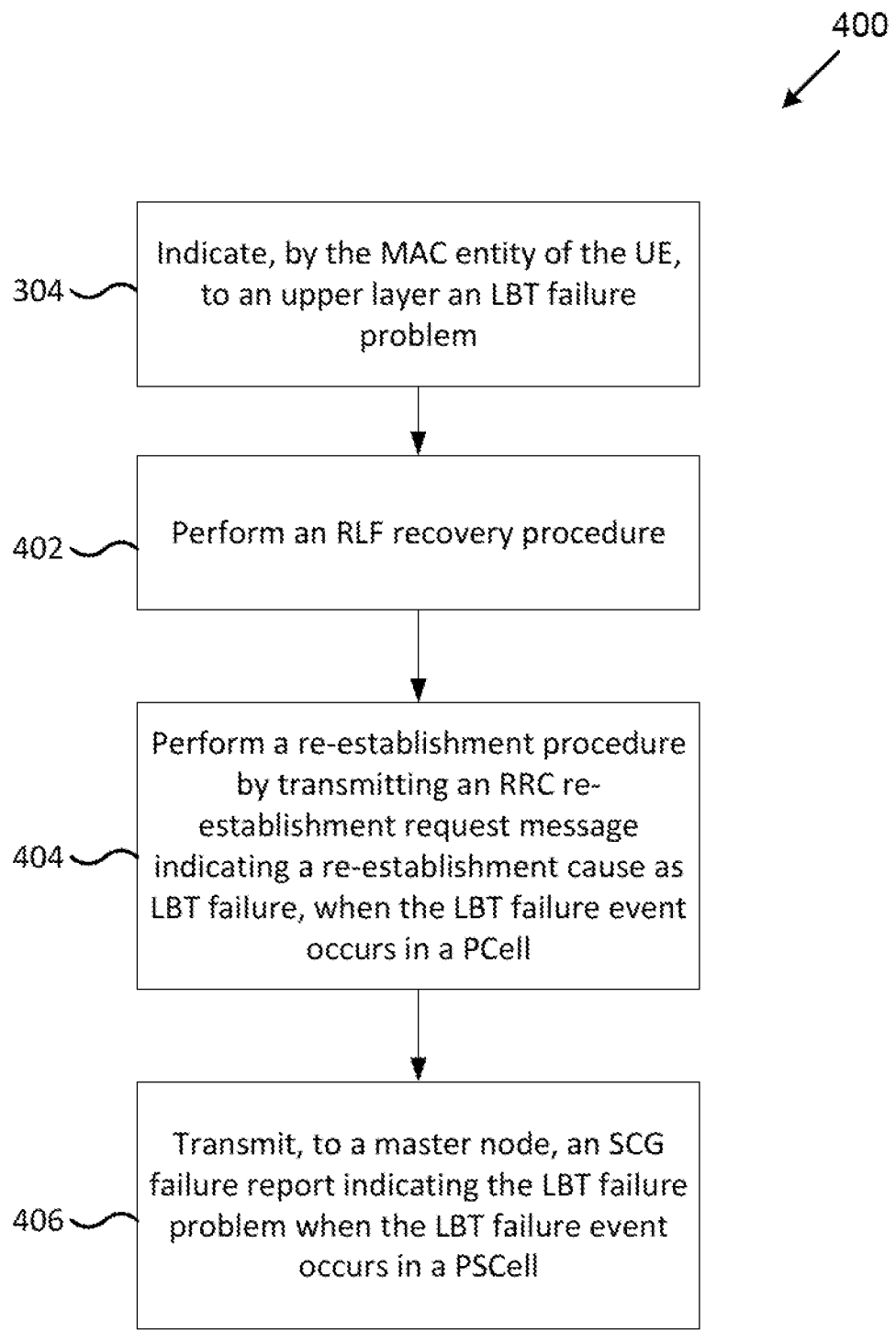
FIG. 4 is a flowchart of an example method performed by a UE when an LBT failure problem is indicated to an upper layer, according to an example implementation of the present application.

FIG. 4 is a flowchart of an example method 400 performed by a UE when an LBT failure problem is indicated to an upper layer, according to an example implementation of the present application. Action 304 shown in FIG. 4 may be corresponding to action 304 shown in FIG. 3. After the MAC entity of the UE indicates the LBT failure problem to an upper layer (e.g., the RRC layer), the UE (e.g., the RRC layer of the UE) may perform an RLF recovery procedure in action 402. In one implementation, the UE may trigger an MCG RLF recovery procedure (e.g., action 404) when the LBT failure event takes place in a PCell, and the UE may trigger an SCG RLF recovery procedure (e.g., action 406) when the LBT failure event takes place in a PSCell. In action 404, the UE may perform a re-establishment procedure by transmitting an RRC re-establishment request message indicating a re-establishment cause as LBT failure when the LBT failure event occurs in a PCell. In action 406, the UE may transmit, to a master node, an SCG failure report indicating the LBT failure problem when the LBT failure event occurs in a PSCell. It should be noted that action 404 and action 406 are not construed as necessarily order dependent. Moreover, action 404 and/or action 406 may be optionally omitted in some of the present implementations.

In one implementation, there may be an LBT failure indication but no LBT success indication. When there is no LBT success indication, there may be an LBT success timer. In one implementation, an expiry time for the LBT success timer may correspond to the time period in action 108. In one implementation, when the MAC entity instructs a lower layer (e.g., the PHY layer) to start an UL transmission attempt (e.g., transmitting a random access preamble, transmitting a msg3, transmitting a msgA, signaling an SR on one valid PUCCH resource, or transmitting UL data using configured grants), the MAC entity may start or restart the LBT success timer for each attempt. In one implementation, when the LBT success timer is running and the MAC entity receives an LBT failure indication, the UE (or the MAC entity of the UE) may stop the LBT success timer and consider the attempt as unsuccessful. In one implementation, the MAC entity may start or restart the LBT success timer when the MAC entity receives an LBT failure indication from the lower layer. In one implementation, the MAC entity may consider the attempt as successful when the LBT success timer expires. In one implementation, the MAC entity may reset the LBT failure counter when the MAC entity considers the attempt as successful (e.g., when the LBT success timer expires).

In one implementation, when the MAC entity instructs a lower layer (e.g., the PHY layer) an attempt to start an UL transmission, the MAC entity may start or restart the LBT success timer for each attempt when the associated resource arrives. In one implementation, when the MAC entity indicates/instructs the lower layer to transmit a random access preamble, the MAC entity may start or restart the LBT success timer in the first symbol of the selected valid PRACH resource. In one implementation, when the MAC entity indicates/instructs the lower layer to signal an SR, the MAC entity may start or restart the LBT success timer in the first symbol of the selected valid PUCCH resource for the SR. In one implementation, when the MAC entity indicates/instructs the lower layer to transmit UL data using configured grants, the MAC entity may start or restart the LBT success timer in the first symbol of the stored uplink configured grants.

In one implementation, the UE (or the MAC entity of the UE) may start or restart the LBT success timer when the value(s) of the LBT success timer is reconfigured by the upper layer (e.g., reconfigured by RRC signaling). In one implementation, the UE may start or restart the LBT success timer when an operating condition changes, such as a change in the operating (or serving) LBT channel, sub-band, BWP, carrier, or cell.

In one implementation, there may be no LBT success indication, and the UE may decide whether LBT is successful or not based on whether a corresponding LBT failure indication is received or not. For example, when the MAC entity indicates/instructs the lower layer to transmit a random access preamble, the MAC entity may consider the LBT for this attempt as successful if the MAC layer does not receive a corresponding LBT failure indication (e.g., at the beginning of the selected valid PRACH resource or at the end of the selected valid PRACH resource). For example, when the MAC entity indicates/instructs the lower layer to signal an SR, the MAC entity may consider the LBT for the attempt as successful if the MAC entity does not receive a corresponding LBT failure indication (e.g., at the beginning of the selected valid PUCCH resource for the SR or at the end of the selected valid PUCCH resource for the SR). For example, when the MAC entity indicates/instructs the lower layer to transmit UL data using configured grants, the MAC entity may consider the LBT for the attempt as successful if the MAC layer does not receive a corresponding LBT failure indication at the beginning of the stored uplink configured grants or at the end of the stored uplink configured grants.

In one implementation, there may be not only an LBT failure indication but also an LBT success indication. The MAC entity may increase the LBT failure counter by 1 when receiving an LBT failure indication. In one implementation, the LBT success indication may be regardless of MAC operations (e.g., RACH procedure, SR procedure), and there may be a common LBT failure counter for all MAC operations. The MAC entity may decrease the LBT failure counter by 1 for all MAC operations when receiving the LBT success indication. In one implementation, there may be different LBT failure counters for different MAC operations. The MAC entity may decrease the different LBT failure counters for different MAC operations by 1 when receiving a common LBT success indication. In one implementation, there may be different types of LBT success indications corresponding to different types of MAC operations. The MAC entity may decrease a specific LBT failure counter by 1 when receiving a corresponding LBT success indication for a specific MAC operation.

In one implementation, the MAC entity may identify which attempt a received common LBT failure indication is associated with. In one implementation, the MAC entity may identify which attempt a received common LBT success indication is associated with. In one implementation, the MAC entity may identify which attempt the received common LBT failure (or success) indication is associated with based on the timing of the resource used/selected by the attempt (e.g., the stored uplink configured grant, the selected PRACH resource, or the valid PUCCH resources for an SR).

Figure 5:
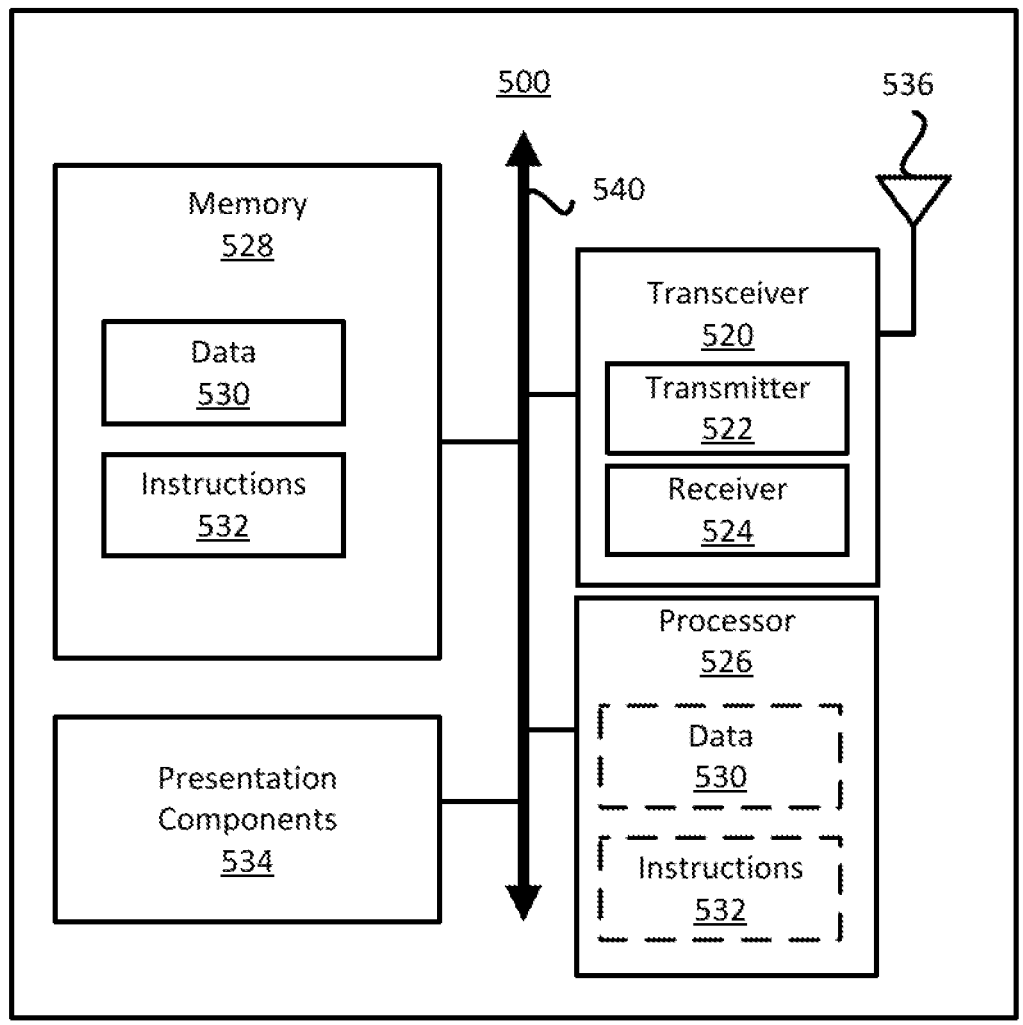
FIG. 5 is a block diagram illustrating a node for wireless communication according to various aspects of the present application.

FIG. 5 is a block diagram illustrating a node for wireless communication, in accordance with various aspects of the present application. As shown in FIG. 5, a node 500 may include a transceiver 520, a processor 528, a memory 534, one or more presentation components 538, and at least one antenna 536. The node 500 may also include an RF spectrum band module, a base station (BS) communications module, a network communications module, and a system communications management module, Input/Output (I/O) ports, I/O components, and power supply (not explicitly shown in FIG. 5). Each of these components may be in communication with each other, directly or indirectly, over one or more buses 540. In one implementation, the node 500 may be a UE or a base station that performs various functions described herein, for example, with reference to FIGS. 1 through 4.

The transceiver 520 having a transmitter 522 (e.g., transmitting/transmission circuitry) and a receiver 524 (e.g., receiving/reception circuitry) may be configured to transmit and/or receive time and/or frequency resource partitioning information. In some implementations, the transceiver 520 may be configured to transmit in different types of subframes and slots including, but not limited to, usable, non-usable and flexibly usable subframes and slot formats. The transceiver 520 may be configured to receive data and control channels.

The node 500 may include a variety of computer-readable media. Computer-readable media may be any available media that may be accessed by the node 500 and include both volatile and non-volatile media, removable and non-removable media. By way of example, and not limitation, computer-readable media may comprise computer storage media and communication media. Computer storage media include both volatile and non-volatile, removable and non-removable media implemented in any method or technology for storage of information such as computer-readable instructions, data structures, program modules or data.

Computer storage media includes RAM, ROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media do not comprise a propagated data signal. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer-readable media.

The memory 534 may include computer-storage media in the form of volatile and/or non-volatile memory. The memory 534 may be removable, non-removable, or a combination thereof. Example memory includes solid-state memory, hard drives, optical-disc drives, and etc. As illustrated in FIG. 5, The memory 534 may store computer-readable, computer-executable instructions 532 (e.g., software codes) that are configured to, when executed, cause the processor 528 to perform various functions described herein, for example, with reference to FIGS. 1 through 4. Alternatively, the instructions 532 may not be directly executable by the processor 528 but be configured to cause the node 500 (e.g., when compiled and executed) to perform various functions described herein.

The processor 528 (e.g., having processing circuitry) may include an intelligent hardware device, e.g., a Central Processing Unit (CPU), a microcontroller, an ASIC, and etc. The processor 528 may include memory. The processor 528 may process the data 530 and the instructions 532 received from the memory 534, and information through the transceiver 520, the base band communications module, and/or the network communications module. The processor 528 may also process information to be sent to the transceiver 520 for transmission through the antenna 536, to the network communications module for transmission to a core network.

One or more presentation components 538 presents data indications to a person or other device. Examples of presentation components 538 may include a display device, speaker, printing component, vibrating component, etc.

From the above description, it is manifested that various techniques may be used for implementing the concepts described in the present application without departing from the scope of those concepts. Moreover, while the concepts have been described with specific reference to certain implementations, a person of ordinary skill in the art may recognize that changes may be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A user equipment (UE) comprising:
one or more non-transitory computer-readable media having computer-executable instructions embodied thereon; and
at least one processor coupled to the one or more non-transitory computer-readable media, the at least one processor is configured to execute the computer-executable instructions to:
receive, by a Medium Access Control (MAC) entity of the UE, a Listen-Before-Talk (LBT) failure indication from a lower layer of the UE for all uplink (UL) transmissions;
increase an LBT failure counter when the MAC entity receives the LBT failure indication;
determine that an LBT failure event has occurred when the LBT failure counter is greater than or equal to a threshold;
indicate, by the MAC entity of the UE, to an upper layer of the UE an LBT failure problem after determining that the LBT failure event has occurred; and
transmit, to a secondary node, a Master Cell Group (MCG) failure report including information of the LBT failure problem when the LBT failure event occurs in a Primary Cell (PCell) or MCG.

2. The UE of claim 1, wherein the at least one processor is further configured to execute the computer-executable instructions to:
perform a Radio Link Failure (RLF) recovery procedure.

3. The UE of claim 1, wherein the at least one processor is further configured to execute the computer-executable instructions to:
perform a re-establishment procedure by transmitting a Radio Resource Control (RRC) re-establishment request message indicating a re-establishment cause as LBT failure, when the LBT failure event occurs in a Primary Cell (PCell).

4. The UE of claim 1, wherein the at least one processor is further configured to execute the computer-executable instructions to:
transmit the Master Cell Group (MCG) failure report to the secondary node operating on a licensed spectrum.

5. The UE of claim 1, wherein the at least one processor is further configured to execute the computer-executable instructions to:
transmit the Master Cell Group (MCG) failure report to the secondary node operating on an unlicensed spectrum.

6. The UE of claim 1, wherein the at least one processor is further configured to execute the computer-executable instructions to:
reset the LBT failure counter when the threshold is reconfigured.

7. The UE of claim 1, wherein the at least one processor is further configured to execute the computer-executable instructions to:
reset the LBT failure counter when the UE switches from an active Bandwidth Part (BWP) of the UE to another BWP.

8. A method comprising:
receiving, by a Medium Access Control (MAC) entity of the user equipment (UE), a Listen-Before-Talk (LBT) failure indication from a lower layer of the UE for all uplink (UL) transmissions;
increasing an LBT failure counter when the MAC entity receives the LBT failure indication;
determining that an LBT failure event has occurred when the LBT failure counter is greater than or equal to a threshold;
indicating, by the MAC entity of the UE, to an upper layer of the UE an LBT failure problem after determining that the LBT failure event has occurred; and
transmitting, to a secondary node, a Master Cell Group (MCG) failure report including information of the LBT failure problem when the LBT failure event occurs in a Primary Cell (PCell) or MCG.

9. The method of claim 8, further comprising performing a Radio Link Failure (RLF) recovery procedure.

10. The method of claim 8, further comprising performing a re-establishment procedure by transmitting a Radio Resource Control (RRC) re-establishment request message indicating a re-establishment cause as LBT failure, when the LBT failure event occurs in a Primary Cell (PCell).

11. The method of claim 8, further comprising transmitting the Master Cell Group (MCG) failure report to the secondary node operating on a licensed spectrum.

12. The method of claim 8, further comprising transmitting the Master Cell Group (MCG) failure report to the secondary node operating on an unlicensed spectrum.

13. The method of claim 8, further comprising resetting the LBT failure counter when the threshold is reconfigured.

14. The method of claim 8, further comprising resetting the LBT failure counter when the UE switches from an active Bandwidth Part (BWP) of the UE to another BWP.

* * * * *